US008666531B2

(12) United States Patent
Chen et al.

(10) Patent No.: US 8,666,531 B2
(45) Date of Patent: Mar. 4, 2014

(54) SLICING METHOD FOR RAPID PROTOTYPING APPARATUS (75) Inventors: Wei Yu Chen, Hsin-Chu (TW); Hsueh Kuan Shih, Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 384 days.

(21) Appl. No.: 13/116,586

(22) Filed: May 26, 2011

(65) Prior Publication Data

US 2011/0295398 A1 Dec. 1, 2011

(30) Foreign Application Priority Data

May 31, 2010 (CN) .......................... 2010 1 0199379

(51) Int. Cl.
G06F 19/00 (2011.01)
(52) U.S. Cl.
USPC .......................................... 700/119; 264/308
(58) Field of Classification Search
USPC .......................................... 700/119; 264/308
See application file for complete search history.

(56) References Cited

U.S. PATENT DOCUMENTS 6,165,406 A * 12/2000 Jang et al. ...................... 264/308
8,155,774 B2 4/2012 Wu et al.

FOREIGN PATENT DOCUMENTS

| CN | 1911635 A | 2/2007 |
| CN | 101670661 A | 3/2010 |
| TW | I370409 | 1/2009 |

OTHER PUBLICATIONS

Shiming, "The Realization Technique Research of Conceptual Production Based on Rapid Prototyping,", Thesis, Graduate School of National University of Defense Technology, pp. 1-15 (Nov. 15, 2006).
Han et al., "The Rapid Prototype Machine Based on Polar Coordinates Mechanism," Beijing University, pp. 1-5 (Apr. 25, 2004).

* cited by examiner

*Primary Examiner* — Carlos Ortiz Rodriguez
(74) *Attorney, Agent, or Firm* — Muncy, Geissler, Olds & Lowe, P.C.

(57) ABSTRACT

A slicing method for a rapid prototyping apparatus with a printing module is provided, which comprises the following steps: (a) accessing data of plural cut points generated from a slicing plane of an object intersecting with plural grids; (b) determining whether a printing module performs an achromatic color printing or not; (c) if yes, connecting two cut points to form a first slicing outline based on the data of the plural cut points, wherein the cut points are generated from the slicing plane intersecting with each grid; (d) checking whether a discontinuous plane exists in the first slicing outline or not, wherein if yes, cut points are paired with a polar coordinate, a connecting path with a smaller included angle is selected, and the first slicing outline connects with the connecting path to form a closed slicing outline to perform an achromatic inkjet printing in the closed slicing outline.

9 Claims, 11 Drawing Sheets

SLICING METHOD FOR RAPID PROTOTYPING APPARATUS

CROSS REFERENCE TO RELATED APPLICATION

This application claims the benefits of the People's Republic of China Patent Application Serial Number 201010199379.5, filed on May 31, 2010, the subject matter of which is incorporated herein by reference.

BACKGROUND OF THE INVENTION

1. Field of the Invention

The present invention relates to a slicing method and, more particularly, to a slicing method for a rapid prototyping apparatus.

2. Description of Related Art

A smart discontinuous slicing method is a slicing method applied to three-dimensional rapid prototyping (3DRP). This method can greatly improve the slicing speed. In addition, this method also can avoid connection errors of slicing outlines, which are generated when discontinuous planes of an object exist during the slicing treatment. Hence, correct slicing outlines can also be generated, when the object with the discontinuous planes is sliced based on this method.

Figure 1A:
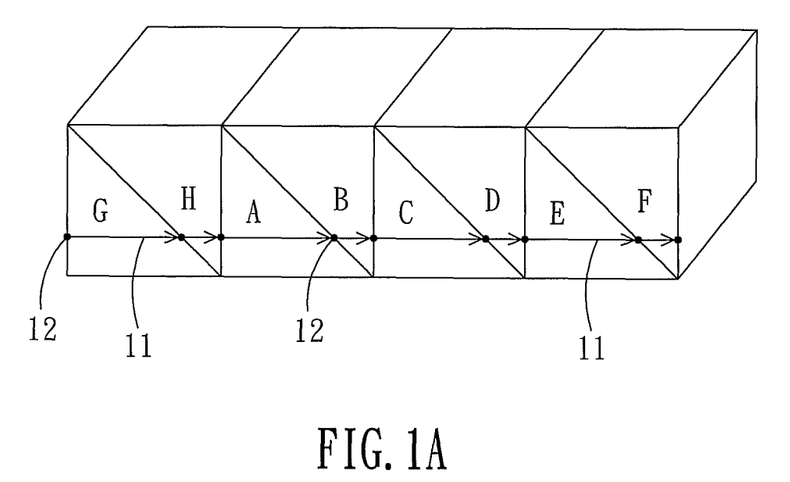
FIG. 1A is a perspective view of a conventional arrangement of grids.
Figure 1B:
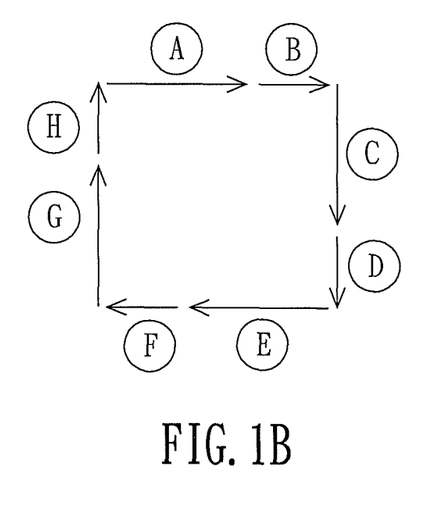
FIG. 1B is a perspective view of a slicing outline of FIG. 1A.

FIG. 1A is a perspective view of a conventional arrangement of grids. As shown in FIG. 1A, eight grids, named A to H, are shown. Two cut points 12 are generated when each grid intersects with a slicing plane 11. The cut points in each grid is determined to be a start cut point or an end cut point in an anti-clockwise direction. In addition, the cut point locating in a path with a downward direction is defined as a start cut point, and a cut point locating in a path with an upward direction is defined as an end cut point. A cut line connecting two cut points is a slicing outline of the slicing plane 11 in the grids A-H. Hence, a set of all cut lines, which are the lines that the slicing plane 11 intersects with the grids A-H, forms a slicing outline of the object in the slicing plane 11, as shown in FIG. 1B.

Figure 2:
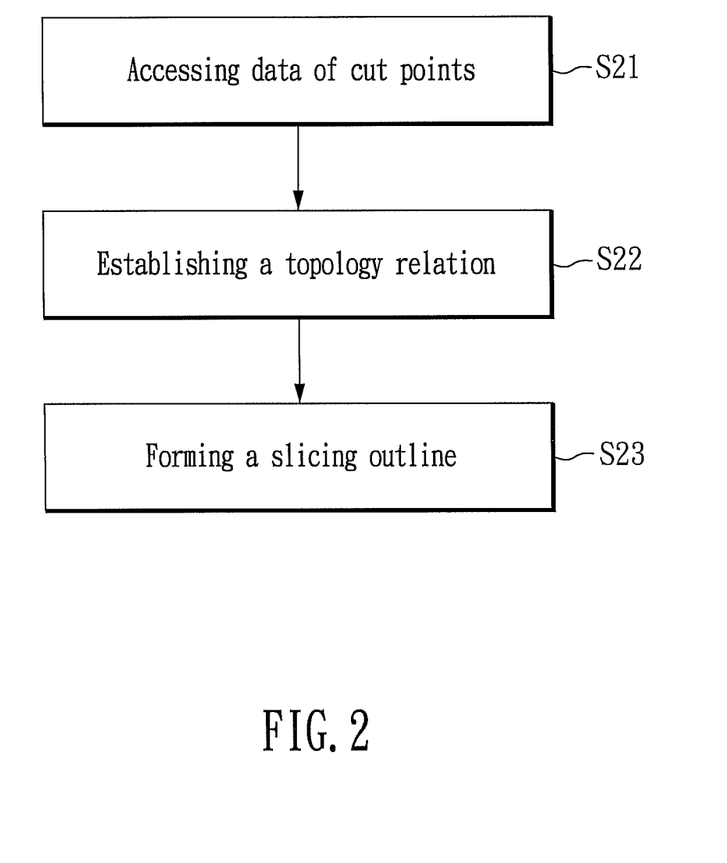
FIG. 2 is a process diagram showing a conventional slicing method generally used in a three-dimensional rapid prototyping (3DRP) system.

According to the conventional slicing method, a topology relationship is used to establish the relationship between grids. FIG. 2 is a process diagram showing a conventional slicing method generally used in a three-dimensional rapid prototyping (3DRP) system. According to the conventional slicing method, data of cut points, which are generated from a slicing plane 11 intersecting with grids A-H, are first accessed (step S21), as shown in FIG. 2 (also accompanied with FIG. 1A). Then, the following relationship between the grids is established based on the topology relationship (step S22):

The grid next to the grid A is the gird B, the grid next to the grid B is the grid C, the grid next to the grid C is the grid D, the grid next to the grid D is the grid E, the grid next to the grid E is the grid F, the grid next to the grid F is the grid G, the grid next to the grid G is the grid H, and the grid next to the grid H is the grid A.

The connection of the cut lines starts from the cut line of the grid A, and the cut line of the grid A connects to the cut line of the grid B. Next, the cut lines connects to those of the grids C, the grids D . . . and to the grids H. The grid next to the grid H is the grid A, so the connection of the cut lines ends in the cut line of the grid H. After the aforementioned process, all the cut lines in this connection can form a slicing outline, as shown in FIG. 1B (step S23).

In general, the topology relationship is used in the conventional slicing method, so the formation of the slicing outline is accomplished through the connection relationship between grids. However, the order for inputting the grids is not defined in the file, which is input into the three-dimensional rapid prototyping system. Hence, the grids are not arranged in order, so there is no order in the cut points and the cut line of the grids. Therefore, a large amount of calculation is required during the process for forming the connection relationship between grids and finding the connection outline. This large amount of calculation may cause the slicing speed decreased, and the performance efficiency of the slicing software may also be reduced.

In addition, according to the slicing method applied with the topology relationship, the slicing outline is formed by the lines connecting between the cut points during the process for forming the outline. The next grid connected to the present grid is sequentially found through the topology relationship, until the next grid is the start grid. The line connecting all the start cut points of all the grids is the slicing outline. However, a problem may arise during the process for forming the slicing outline. It is that the end cut point may connect to the start cut point when the connection between the cut points is completed.

Figure 3A:
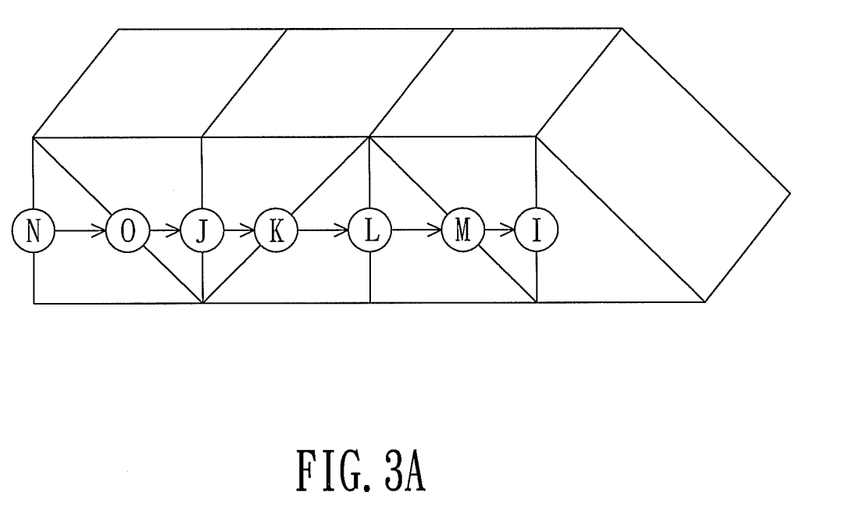
FIG. 3A is a perspective view showing the connection between cut points in a discontinuous plane of an object determined through a conventional topology relationship.
Figure 3B:
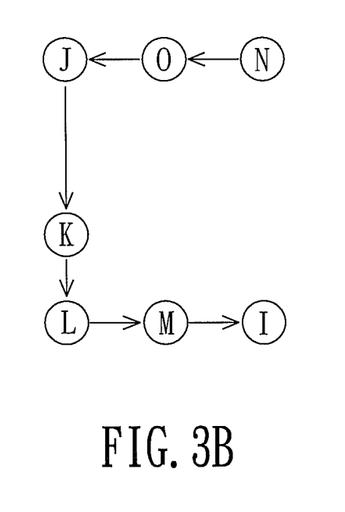
FIG. 3B is a perspective view showing an actual slicing outline of the discontinuous plane of FIG. 3A.
Figure 3C:
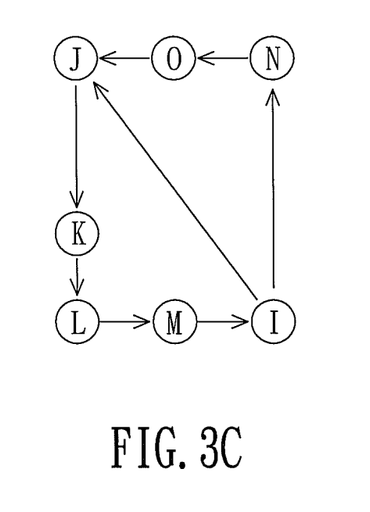
FIG. 3C is a perspective view showing an error in the slicing outline when the topology relationship is applied.

FIG. 3A is a perspective view showing the connection between cut points in a discontinuous plane of an object when a conventional topology relationship is applied, FIG. 3B is a perspective view showing an actual slicing outline of the discontinuous plane, and FIG. 3C is a perspective view showing an error in the slicing outline when the topology relationship is applied. As shown in FIG. 3A, a connection between cut points in a discontinuous plane is shown, and there is no grid next to the grid that the cut point I exists therein. Hence, the actual slicing outline of the discontinuous plane should be that shown in FIG. 3B.

According to the conventional method for connecting the cut points through the topology relationship, the process for forming the slicing outline is mainly divided into three cycles. The first cycle starts from the cut point I, but the first cycle immediately ends because there is no grid next to the grid that the cut point I exists therein. Next, the second cycle starts from the cut point J. Then, the cut point K, the cut point L, the cut point M, the cut point I are sequentially found through the topology relationship, and these cut points connect one by one. There is no grid next to the grid that the cut point I exists therein, so the end cut point I connects to the start cut point J, and the second cycle ends. The third cycle starts from the cut point N. Then the cut point O, the cut point J, the cut point K, the cut point L, the cut point M, the cut point I are sequentially found through the topology relationship, and these cut points connect one by one. There is no grid next to the grid that the cut point I exists therein, so the end cut point I connects to the start cut point N, and the third cycle ends. During the process for forming the slicing outline by use of the conventional method, the end cut point connects to the start cut point when the connection between the cut points ends. Hence, when the conventional slicing method is used, an error in the slicing outline shown in FIG. 3C may be generated compared to the actual slicing outline shown in FIG. 3B, i.e. the end cut point I spontaneously connects to the start cut point J, and the end cut point I also connects to the start cut point N.

Actually, the conventional slicing method applied with the topology relationship in an imperfect connection relationship between grids. More specifically, the grid A only connects to the grid B, and the grid B only connects to the grid C. Hence, the grids have to be found one by one during the process for forming the slicing outline, i.e. the grid B is found from the grid A, and the grid C only can be found from the grid B. When there is a discontinuous plane, the connection between planes cannot be performed well anymore, so the topology relationship is no longer suitable. Therefore, the conventional slicing method cannot be used for processing discontinuous planes of an object. In addition, it cannot be ensured that there are not any discontinuous planes in the file, which is input into the three-dimensional rapid prototyping system. Hence, the conventional slicing method generally used in the art cannot fully satisfy the requirement for the three-dimensional rapid prototyping system.

Therefore, it is desirable to provide a slicing method for a rapid prototyping apparatus, which can solve the aforementioned problems that the performance efficiency of slicing software is low and the conventional method cannot be used for processing discontinuous planes of an object.

SUMMARY OF THE INVENTION

The object of the present invention is to provide a slicing method for a rapid prototyping apparatus, which can solve the problems that the performance efficiency of a conventional slicing method is low and the conventional slicing method cannot be performed on discontinuous planes of an object.

To achieve the object, a broad aspect of the present invention is to provide a slicing method for a rapid prototyping apparatus with a printing module, which at least comprises: (a) accessing data of plural cut points, which are generated from a slicing plane of an object intersecting with plural grids; (b) determining whether a printing module performs an achromatic color printing or not; (c) if yes, connecting two cut points to form a first slicing outline based on the data of the plural cut points, wherein the cut points are generated from the slicing plane intersecting with each grid; (d) checking whether a discontinuous plane exists in the first slicing outline or not, wherein if yes, cut points are paired with a polar coordinate, a connecting path with a smaller included angle is selected, and the first slicing outline connects with the connecting path to form a closed slicing outline to perform an achromatic inkjet printing in the closed slicing outline.

Anther objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The printing method of a rapid prototyping apparatus, such as a powder-based three-dimensional rapid prototyping system (3DRP), is a method combining an achromatic inkjet printing with a colored inkjet printing. Herein, the achromatic inkjet printing forms the inner part within an outline of an object, which is usually accomplished with transparent glue. In addition, the colored inkjet printing forms the periphery outline of the object, which is usually accomplished with colored glue. During the printing process, printing modules (not shown in the figure) of the rapid prototyping apparatus respectively sprays glue to make the inner part of the outline binding to the periphery outline of the object. The slicing outlines of each slicing planes of the object are obtained from the lines connecting cut points, which are generated from the slicing planes intersecting with grids. In general, achromatic slicing outlines and colored slicing outlines are closed outlines after the object is sliced. However, when the object has discontinuous planes, the slicing outlines are not closed outlines. Therefore, the range for achromatic printing cannot be ensured.

The achromatic slicing outlines is used for the inkjet printing in the inner part within the outline of the object, but the colored slicing outline is used for the inkjet printing only in the periphery outline of the object. If there are discontinuous planes existing in the object, the range for the achromatic inkjet printing cannot be ensured. In this case, the achromatic slicing outlines and the colored slicing outlines cannot be processed at the same time.

Figure 4A:
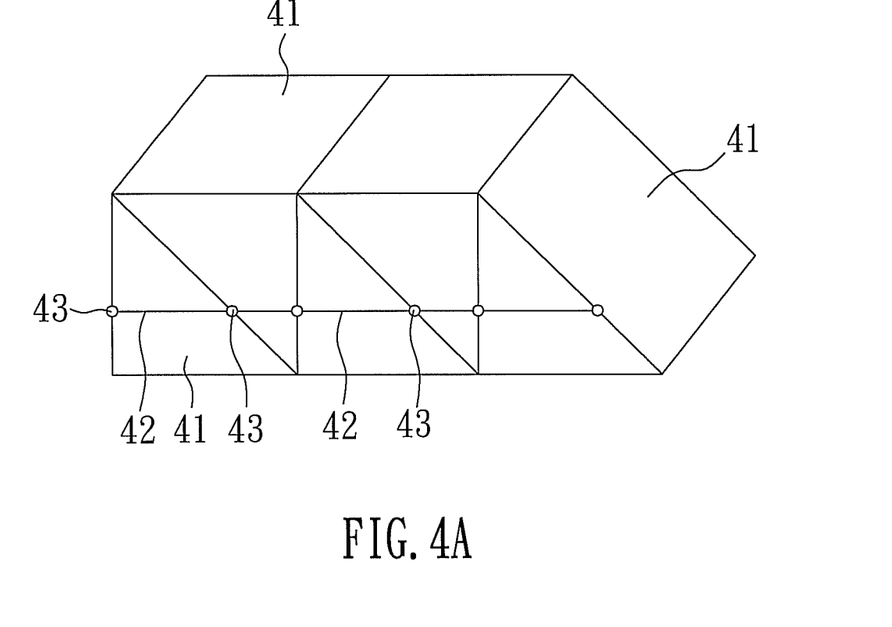
FIG. 4A is a perspective view showing a continuous connection between cut points in a slicing plane of a continuous plane of an object.
Figure 4B:
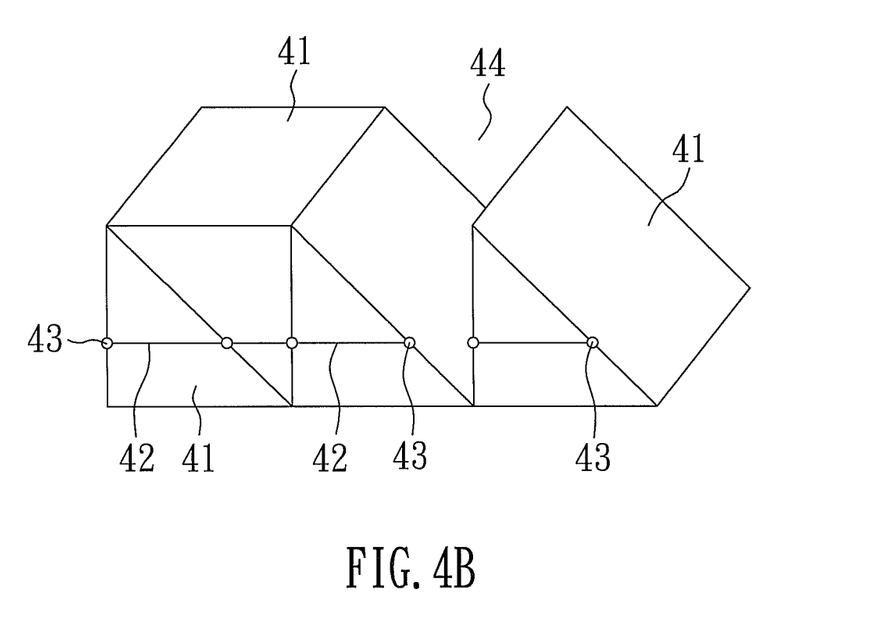
FIG. 4B is a perspective view showing a connection between cut points in a slicing plane of a discontinuous plane of an object.

The slicing outlines are formed according to the relationship between the grids and the slicing planes. When one grid is processed, two cut points, which are generated by the grid intersecting with a slicing plane, connect to each other to form a cut line. After all the grids are processed, a slicing outline can be obtained. FIG. 4A is a perspective view showing a continuous connection between cut points in a slicing plane of a continuous plane of an object. As shown in FIG. 4A, plural grids 41 connect to each other, so the cut points 43, which are generated by the grids 41 intersecting with the slicing plane 42, connect to each other to form a desired slicing outline. FIG. 4B is a perspective view showing a connection between cut points in a slicing plane of a discontinuous plane of an object. As shown in FIG. 4B, there is no cut point generated due to the unavailability of a discontinuous grid 44, so a cutting line connecting to the cut point 43 of the adjacent grid 41 cannot form. Therefore, a slicing outline with a discontinuous plane is generated.

Figure 5:
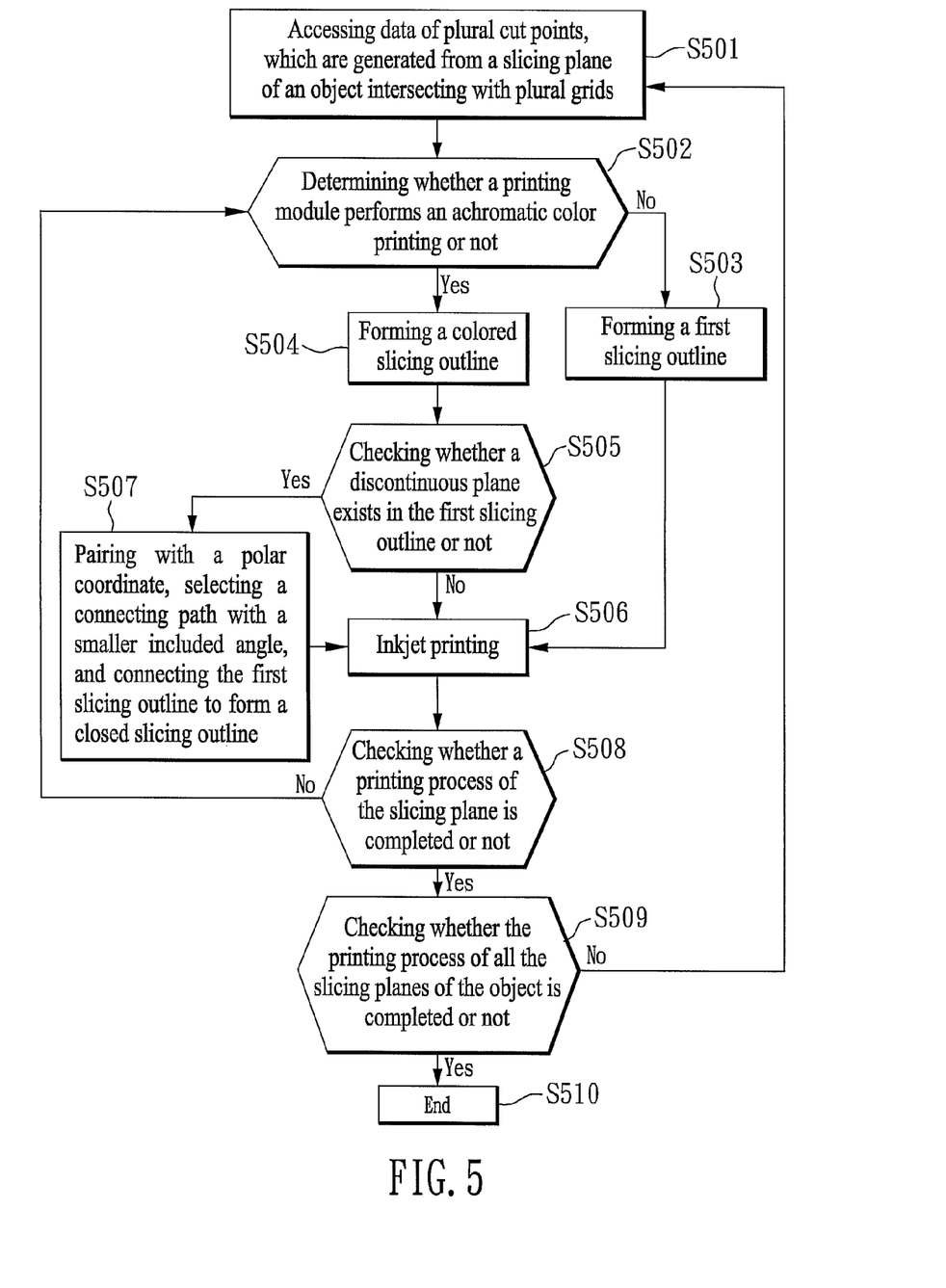
FIG. 5 is a slicing method for a rapid prototyping apparatus according to a preferred embodiment of the present invention.
Figure 6A:
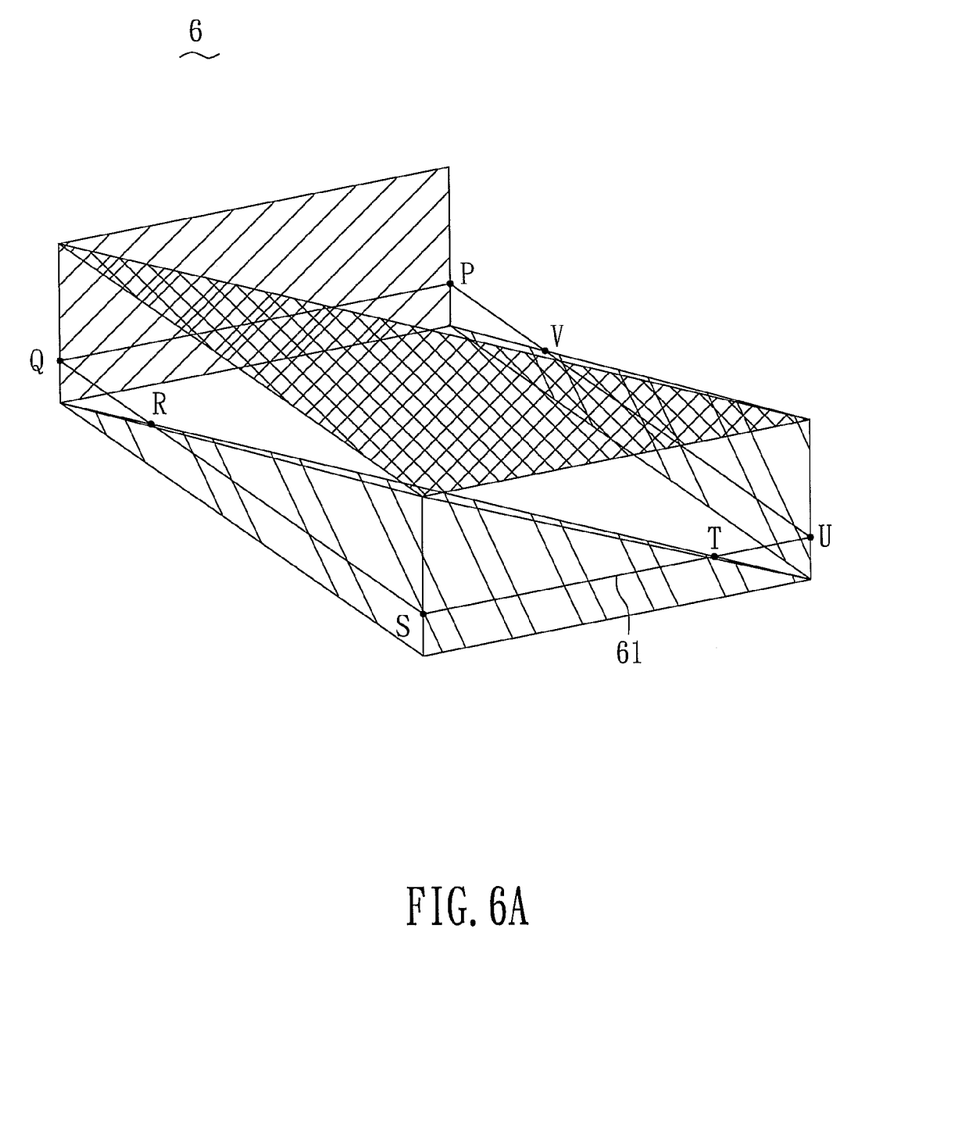
FIG. 6A is a perspective view showing a structure of an object with discontinuous planes.

The achromatic slicing outline has to be a closed outline, and therefore the range for the achromatic printing can be ensured. No matter whether the colored slicing outline is a closed outline or not, it is irrelevant to the achromatic slicing outline. If the achromatic slicing outline possesses its closed property, the problem of an error caused by the discontinuous plane can be solved. FIG. 5 is a slicing method for a rapid prototyping apparatus according to a preferred embodiment of the present invention. The present invention provide a slicing method, which can make the achromatic slicing outline of the discontinuous plane connecting into a actual closed slicing outline, in order to eliminate the error caused by the discontinuous plane. As shown in FIG. 5, data of plural cut points are accessed, which are generated from a slicing plane of an object intersecting with plural grids (step S501). For example, FIG. 6A shows data of plural cut points P-V, which are generated by a slicing plane 61 of an object 6 intersecting with plural grids (not shown in the figure). Each data of the cut points comprises a coordinate, color, and figure information of each cut point, and each cut point has its own index. In addition, the cut point in each grid is determined to be a start cut point or an end cut point in an anti-clockwise direction, wherein the cut point locating in a path with a downward direction is defined as the start cut point, and the cut point locating in a path with an upward direction is defined as the end cut point. The index of the start cut point can be defined as 0 or even numbers, and the index of the end cut point can be defined as odd numbers. The indexes of all the cut points are different, but the data of the cut points may be duplicated. When one cut point has two indexes and the data of this cut point are duplicated, it means that the two grids that the cut point exists therein are adjacent. When one cut point only has one index, it indicates that this cut point only exists in one grid, and a discontinuous plane is started from this cut point. When there is a discontinuous plane, the rule for connecting two cut points is processes as follow. (1) Two cut points can only be connected to each other from the start cut point to the end cut point, but cannot be connected "from the start cut point to the start cut point", or "from the end cut point to the end cut point". (2) In the case that one cut point itself is an end cut point of a continuous plane and also a start cut point of a discontinuous plane, this cut point cannot connect to a start cut point of the continuous plane when a connection of the discontinuous plane is performed.

Figure 6B:
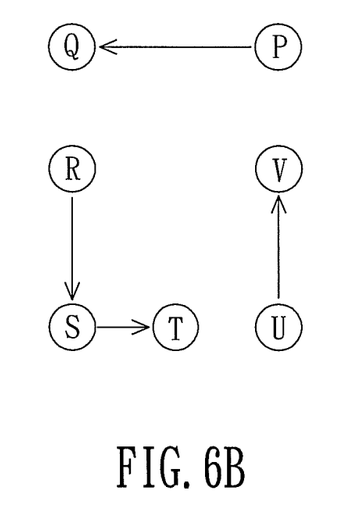
FIG. 6B is a perspective view showing a non-closed slicing outline of a slicing plane of the object in FIG. 6A.

Next, the step S502 is performed to determine whether a printing module performs an achromatic color printing or not. If the result is no, the step S503 is performed, and two cut points, which are generated from the slicing plane intersecting with each grid, are connected to each other to form a colored slicing outline based on the data of the plural cut points (step S503). For example, the printing module performs a colored inkjet printing in the colored slicing outline according to the slicing outline shown in FIG. 6B. On the contrary, if the result is yes, two cut points, which are generated from the slicing plane intersecting with each grid, are connected to each other to form a first slicing outline based on the data of the plural cut points (step S504). The shape of the first slicing outline is the same as that of the outline shown in FIG. 6B, except that the colored slicing outline formed in the step S503 comprises information for colored inkjet printing.

Then, the step S505 is performed to check whether a discontinuous plane exists in the first slicing outline or not. If the result is yes, cut points are paired with a polar coordinate, and a connecting path with a smaller included angle is selected. More specifically, the method for changing a non-closed slicing outline into a closed slicing outline is accomplished through pairing cut points with the polar coordinate. Then, a preferred connecting end is determined by the included angle to give the connecting path, and the first slicing outline connects to the connecting path to form a closed slicing outline (step S507).

Next, an achromatic inkjet printing is performed within the closed slicing outline (step S506). After the achromatic inkjet printing is completed, whether the printing processes (i.e. the achromatic inkjet printing and/or the colored inkjet printing) on the slicing plane are completed or not is checked. If the result is no, the step S502 is re-performed. On the contrary, if the result is yes, whether the printing process on all the slicing planes of the object is completed or not is checked (step S509). If the result of the step S509 is no, the step S501 is re-performed. On the other hand, if the result of the step S509 is yes, the slicing process of the object is completed (step S510).

Figure 7A:
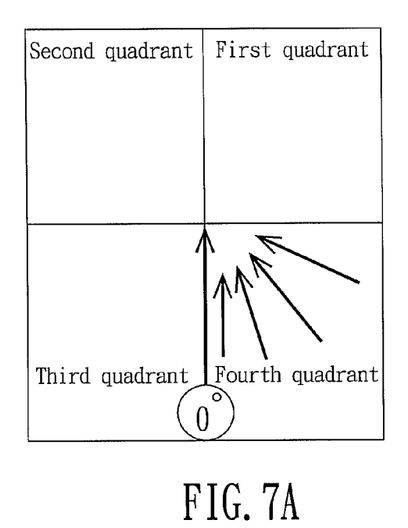
FIGS. 7A-7D are perspective views showing positions of polar axes of polar coordinates.
Figure 7B:
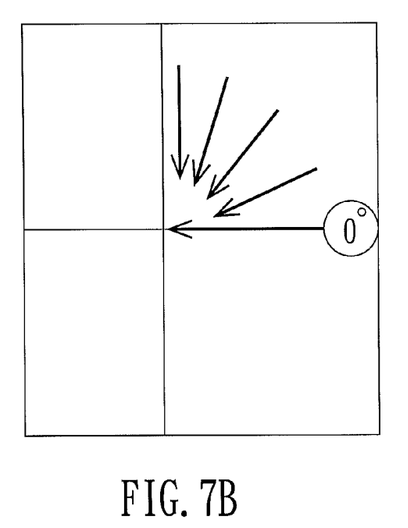
Figure 7C:
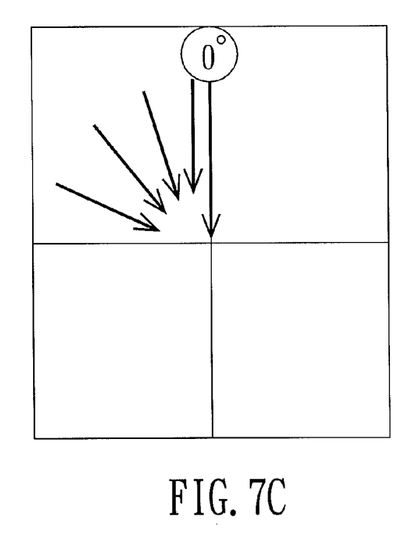
Figure 7D:
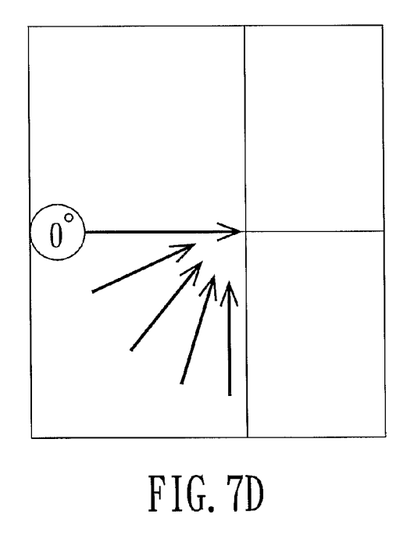
Figure 8A:
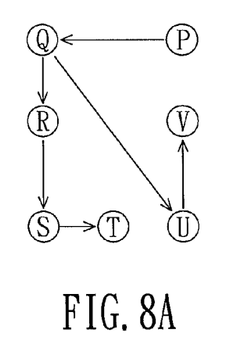
FIGS. 8A-8F are perspective views showing a process for connecting a non-closed slicing outline into a closed slicing outline.
Figure 8B:
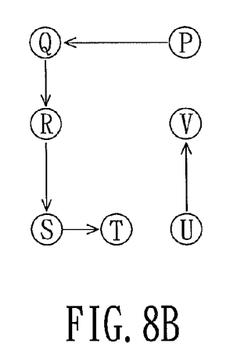
Figure 8F:
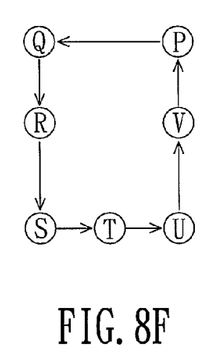
Figure 9:
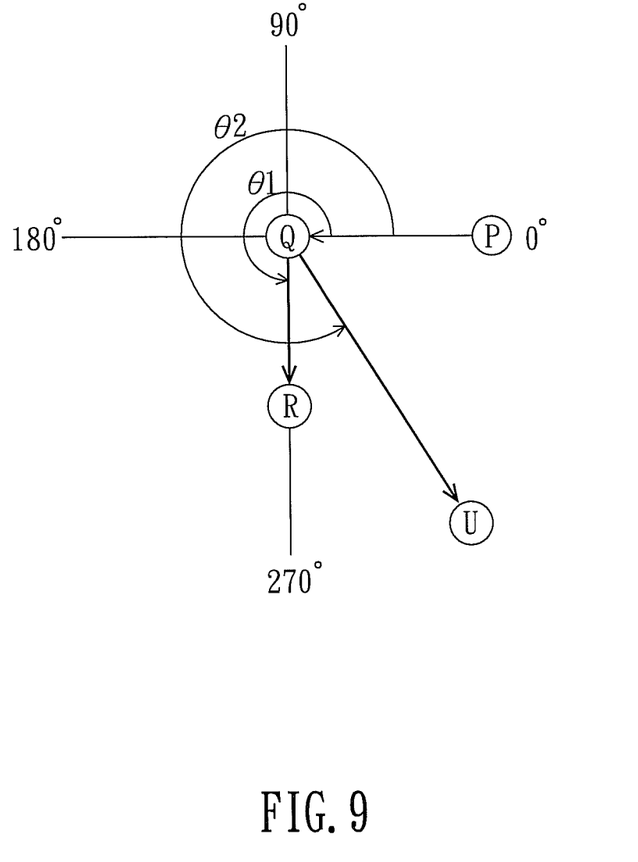
FIG. 9 is a perspective view showing a selection of a connection path of a cut point Q in FIG. 8A.

The method for pairing the polar coordinate with the cut points to find a preferred connecting path is described as follow. FIGS. 7A-7D are perspective views showing positions of polar axes of polar coordinates. As show in FIGS. 7A-7D, the polar coordinate can be divided into four quadrants, which are respectively the first quadrant (0°-90°), the second quadrant (90°-180°), the third quadrant (180°-270°), and the fourth quadrant (270°-360°). The position of the polar axis (0°) is determined based on "a direction of a previous path" in the polar coordinate. As shown in FIG. 7A, when "the direction of the previous path" is located on the fourth quadrant, the position of the polar axis (0°) is located on a negative Y-axis. As shown in FIG. 7B, when "the direction of the previous path" is located on the first quadrant, the position of the polar axis (0°) is located on a positive X-axis. As shown in FIG. 7C, when "the direction of the previous path" is located on the second quadrant, the position of the polar axis (0°) is located on a positive Y-axis. In addition, as shown in FIG. 7D, when "the direction of the previous path" is located on the third quadrant, the position of the polar axis (0°) is located on a negative X-axis According to the method of the present invention that the polar coordinate is paired to find a connection path, the position of the polar coordinate is first determined according to the position of "the direction of the previous path" located in the polar coordinate. When the position of the polar axis (0°) is determined, a connecting path with a smaller included angle, which is formed by the polar axis and the connecting path, is selected, and a suitable cut point can be found. FIGS. 8A-8F are perspective views showing a process for connecting a non-closed slicing outline into a closed slicing outline, wherein FIG. 8A is a perspective view of the non-closed slicing outline shown in FIG. 6B. The process for changing a non-closed slicing outline shown in FIG. 8A into a closed slicing outline shown in FIG. 8F is described as follows. First, the cut point Q is the end cut point of the connection line PQ, and the possible cut points to be connect with the cut point Q is the start cut point R of the connection line RS or the start cut point U of the connection line UV. Referring to FIG. 8A and FIG. 9, the position of the polar axis (0°) is located on the positive X-axis based on "the direction of the previous path" P→Q (as shown in FIG. 7B), wherein the included angle θ1 is an angle started from the polar axis (0°) and ended in the connection line QR, and the included angle θ2 is an angle started from the polar axis and ended in the connection line QU. During the process for selecting a suitable connection path, the connection path with a smaller included angle is selected. In the present case, the included angle θ1 is smaller than the included angle θ2, and therefore the connection path Q→R is a preferred connection path, as shown in FIG. 8B.

Figure 6C:
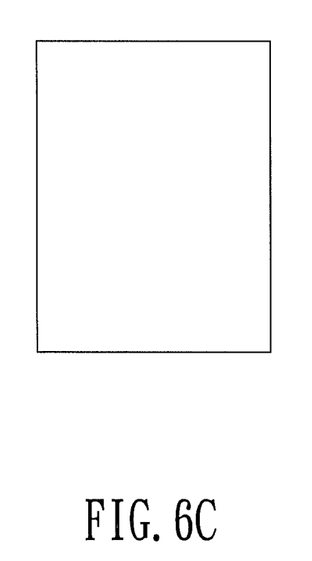
FIG. 6C is a perspective view showing that the non-closed slicing outline of FIG. 6B is connected to form a closed slicing outline.
Figure 6D:
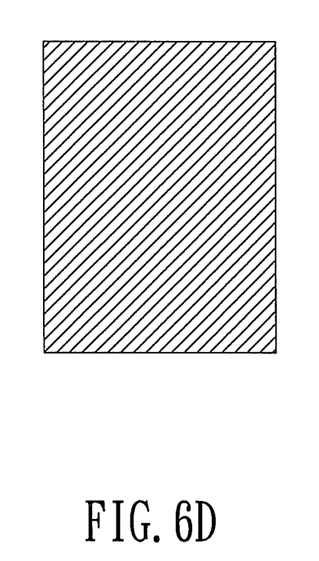
FIG. 6D is a perspective view showing that an achromatic inkjet printing is performed inside the closed slicing outline shown in FIG. 6C.
Figure 8C:
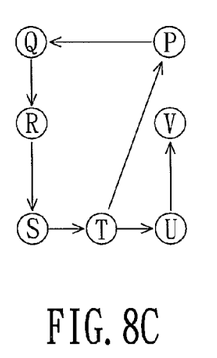
Figure 8D:
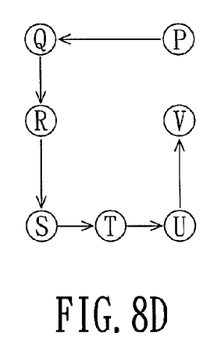
Figure 8E:
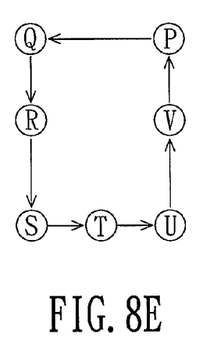
Figure 10:
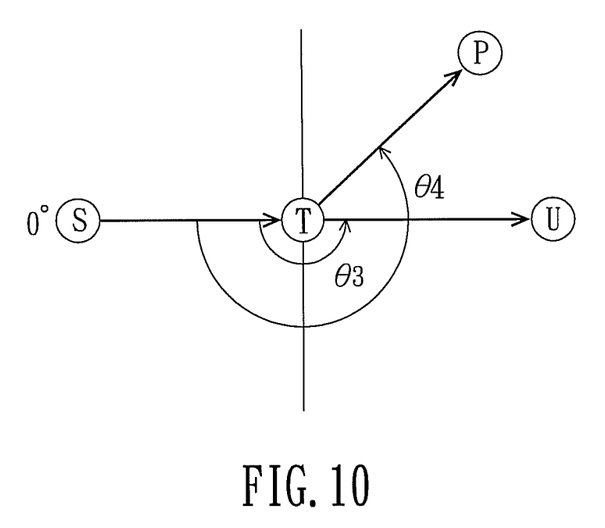
FIG. 10 is a perspective view showing a selection of a connection path of a cut point T in FIG. 8C.
Figure 11:
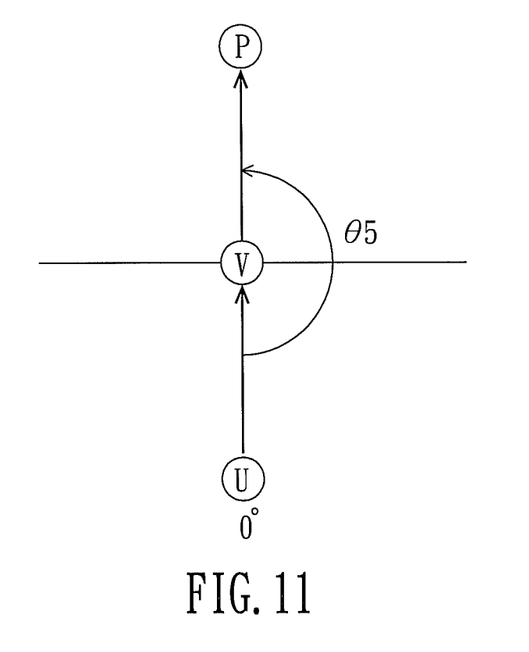
FIG. 11 is a perspective view showing a selection of a connection path of a cut point V in FIG. 8E.

Next, as shown in FIG. 8C, the cut point T is the end cut point of the connection line ST, and the possible cut points to be connect with the cut point T is the start cut point U of the connection line UV or the start cut point P of the connection line PQ. Referring to FIG. 8C and FIG. 10, the position of the polar axis (0°) is located on the negative X-axis based on "the direction of the previous path" S→T (as shown in FIG. 7D), wherein the included angle θ3 is an angle started from the polar axis (0°) and ended in the connection line TU, and the included angle θ4 is an angle started from the polar axis and ended in the connection line TP. During the process for selecting a suitable connection path, the connection path with a smaller included angle is selected. In the present case, the included angle θ3 is smaller than the included angle θ4, and therefore the connection path T→U is a preferred connection path, as shown in FIG. 8D. Then, as shown in FIG. 8E and FIG. 11, the cut point V is the end cut point of the connection line UV. According to "the direction of the previous path" U→V, the position of the polar axis (0°) is located on the negative Y-axis (as shown in FIG. 7A). The included angle θ5 is an angle started from the polar axis (0°) and ended in the connection line VP, and is the smallest included angle. Hence, the connection path V→P is a preferred connection path, as shown in FIG. 8F. After the aforementioned steps, the non-closed slicing outline with three discontinuous planes (shown in FIG. 8A) can be connected to form a closed slicing outline (as shown in FIG. 8F and FIG. 6C), and the range for achromatic printing cannot be ensured. Therefore, as shown in FIG. 6D, the printing module of the rapid prototyping apparatus can perform the achromatic inkjet printing within the achromatic slicing outline shown in FIG. 6B.

In conclusion, the slicing method for the rapid prototyping apparatus of the present invention can connect the first slicing outline to form a closed slicing outline to perform the achromatic inkjet printing within the closed slicing outline, by pairing the polar coordinate and selecting connection paths with smaller included angles. The slicing method of the present invention does not perform with a topology relationship, so the problems of the low efficiency of the conventional slicing method can be solved. In addition, the slicing method of the present invention can also reduce the amount of calculation for grid processing, so the slicing speed can be greatly improved. Furthermore, according to the slicing method of the present invention, when discontinuous planes exist in the achromatic slicing outline of the object, the non-closed slicing outline is connected to form a closed slicing outline by pairing the polar coordinate and selecting connection paths with smaller included angles. Therefore, the slicing process can be performed well to ensure the range for the achromatic inkjet printing by use of the slicing method of the present invention, when there are discontinuous planes existing in the object.

Although the present invention has been explained in relationship to its preferred embodiment, it is to be understood that many other possible modifications and variations can be made without departing from the spirit and scope of the invention as hereinafter claimed.

What is claimed is:

1. A slicing method for a rapid prototyping apparatus with a printing module, comprising the following steps:
   (a) accessing data of plural cut points, which are generated from a slicing plane of an object intersecting with plural grids;
   (b) determining whether a printing module performs an achromatic color printing or not;
   (c) if yes, connecting two cut points to form a first slicing outline based on the data of the plural cut points, wherein the cut points are generated from the slicing plane intersecting with each grid;
   (d) checking whether a discontinuous plane exists in the first slicing outline or not, wherein if yes, the cut points are paired with a polar coordinate by determining a position of a polar axis based on a direction of a previous path in the polar coordinate, a connecting path is selected based on a smaller included angle made by the polar axis and the connecting path when the position of the polar axis is determined, and the first slicing outline connects with the connecting path to form a closed slicing outline to perform an achromatic inkjet printing in the closed slicing outline.

2. The method as claimed in claim 1, wherein the step (c) further comprises a step (c1): if no, connecting two cut points to form a colored slicing outline based on the data of the plural cut points, and the printing module performing a colored inkjet printing in the colored slicing outline.

3. The method as claimed in claim 1, wherein the data of the cut points comprise coordinates, color, and figure information of each cut point.

4. The method as claimed in claim 1, wherein the cut point in each grid is determined to be a start cut point or an end cut point in an anti-clockwise direction, the cut point locating in a path with a downward direction is defined as the start cut point, and the cut point locating in a path with an upward direction is defined as the end cut point.

5. The method as claimed in claim 4, wherein two cut points are connected from the start cut point to the end cut point, and not connected from the start cut point to the start cut point, or from the end cut point to the end cut point.

6. The method as claimed in claim 1, wherein the polar axis is located on a positive X-axis, a negative X-axis, a positive Y-axis, or a negative Y-axis.

7. The method as claimed in claim 1, further comprising a step (e) after the step (d): checking whether a printing process of the slicing plane is completed or not.

8. The method as claimed in claim 7, wherein if no in the step (e), the step (b) is re-performed.

9. The method as claimed in claim 8, further comprising a step (f) after the step (e) if yes in the step (e): checking whether the printing process of all the slicing planes of the object is completed or not, wherein the step (a) is re-performed if no in the step (f), and a slicing treatment on the object is completed if yes in the step (f).

* * * * *